United States Patent
Li

(10) Patent No.: US 7,826,456 B2
(45) Date of Patent: Nov. 2, 2010

(54) METHOD AND SYSTEM FOR VERIFYING UPDATE INFORMATION IN BGP

(75) Inventor: Hejun Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 93 days.

(21) Appl. No.: 12/169,263

(22) Filed: Jul. 8, 2008

(65) Prior Publication Data

US 2008/0267189 A1 Oct. 30, 2008

Related U.S. Application Data

(63) Continuation of application No. PCT/CN2006/002029, filed on Aug. 10, 2006.

(30) Foreign Application Priority Data

Jan. 10, 2006 (CN) .................. 2006 1 0001255

(51) Int. Cl.
*H04L 12/28* (2006.01)
(52) U.S. Cl. .................. 370/392; 370/398; 370/351
(58) Field of Classification Search .................. 370/389, 370/392, 328
See application file for complete search history.

(56) References Cited

U.S. PATENT DOCUMENTS

| 6,487,167 | B1 * | 11/2002 | Shaio ......................... 370/392 |
| 6,704,795 | B1 * | 3/2004 | Fernando et al. ............ 709/237 |
| 7,095,857 | B2 * | 8/2006 | Ishii ........................... 380/278 |
| 2002/0131602 | A1 | 9/2002 | Ishii |
| 2005/0172333 | A1 | 8/2005 | Kim |
| 2005/0198382 | A1 * | 9/2005 | Salmi et al. ................. 709/240 |

FOREIGN PATENT DOCUMENTS

| CN | 1649294 A | 8/2005 |
| JP | 2005-073128 A | 3/2005 |

OTHER PUBLICATIONS

Aggregated Path Authentication for Efficient BGP security, Nov. 2005, by Zhao.*
Evaluating the performance Impact of PKI on BGP security, Feb. 2005, by Zhao.*

(Continued)

*Primary Examiner*—Dang T Ton
*Assistant Examiner*—Pamit Kaur
(74) *Attorney, Agent, or Firm*—Leydig, Voit & Mayer, Ltd.

(57) ABSTRACT

A method for verifying update information in Border Gateway Protocol (BGP), includes: upon receipt of an update message, verifying, by an Autonomous System (AS), the update message according to a determined maximum time of verifications; and trusting the update message if the verifications are successful. The update message may be AS_PATH and/or prefix. In the invention, upon receipt of an update message, the AS verifies the update information according to the maximum time of verifications, which ensures that the time of verifications will not exceed the maximum time of verifications when the AS verifies the update information. Accordingly, load on CPU is decreased during verification of the update information and hence the network convergence speed is improved.

11 Claims, 1 Drawing Sheet

OTHER PUBLICATIONS

International Preliminary Report on Patentability from the International Bureau for corresponding PCT Publication No. WO 2007/079627, that issued on Jul. 15, 2008.

White, R., "Architecture and Deployment Considerations for Secure Origin BGP (so BGP)," May 19, 2005, Network Working Group, location N/A.

Weis, Brian, "Secure Origin BGP (soBGP) Certificates-Internet-Draft," Feb. 2005, Internet Engineering Task Force, Fremont, California.

Ng, James, "Extensions to BGP to Support Secure Origin BGP (soBGP)-Internet Draft," Apr. 2004, Network Working Group, location N/A.

Ng, James, "Extensions to BGP to Support Secure Origin BGP (soBGP)-Internet Draft," Jun. 2003, Network Working Group, location N/A.

Lynn, C., et al., "Secure BGP (S-BGP)—Internet Draft," Jun. 2003, Internet Engineering Task Force, Fremont, California.

Rekhter, Y., et al., "A Border Gateway Protocol 4 (BGP-4)—rfc1771," Mar. 1995, Network Working Group, location N/A.

* cited by examiner

METHOD AND SYSTEM FOR VERIFYING UPDATE INFORMATION IN BGP

CROSS-REFERENCE TO RELATED APPLICATIONS

This application is a continuation of International Patent Application No. PCT/CN2006/002029, filed Aug. 10, 2006, which claims priority to Chinese Patent Application No. 200610001255.5, filed Jan. 10, 2006, both of which are hereby incorporated by reference in their entirety.

FIELD OF THE INVENTION

The invention relates to the field of Border Gateway Protocol (BGP), and more particularly, to a method and system for verifying update information in BGP.

BACKGROUND

BGP is an exterior gateway routing protocol in form of distance vectors, which is mainly used for distributing routing information among autonomous systems (AS). BGP is the core routing protocol for Internet at present, and is a de facto standard for exterior gateway routing protocols. Although BGP is a distance vector routing protocol, it uses incremental and triggered routing updates, instead of periodical updates across the whole routing table used in common distance vector routing protocols, which saves bandwidth occupancy for update.

Update information, including the prefix information, the withdrawn prefix information, the path attributes and so on, is exchanged among ASs via BGP. One important path attribute is the information regarding the AS paths (AS_PATH) through which the BGP update information passes to reach a network. Checking AS_PATH may prevent the occurrence of loop.

In current BGP protocols, there is no mechanism to verify the authenticity of the prefix and the AS_PATH, and thus announcement of illegal prefixes may occur due to wrong system configurations or malicious neighbor attacks. These might lead to attacks, such as routing hole, Denial of Service (DoS) and so on. Meanwhile, any malicious AS along the way might modify the AS_PATH, so that the propagation path for the update message cannot be determined. These are the main security vulnerabilities in BGP.

To solve the above security issues, two extended BGP framework schemes are proposed, that is, Secure Origin BGP (SOBGP) and Secure BGP (SBGP). Similar schemes are used for prefix verification in the two frameworks. By reference to SBGP, detailed descriptions are made below to the prefix verification in the two extended BGP framework schemes.

In SBGP, to verify the prefix information, a prefix owner, such as the top Internet Assigned Numbers Authority (IANA), a Regional Internet Registry (RIR) or an Internet Service Provider (ISP), distributes a certificate on the SBGP routers and authorizes a specific AS with a signature generated by the private key corresponding to the public key in the certificate so that the AS may announce the prefix it owns. The data object of the private key signature is also referred to as Address Attestation (AA), which is the correspondence between the prefix and the number for the AS generating the prefix. The AA information is also distributed among SBGP routers. Upon receipt of an update message, the recipient performs prefix verification according to the AA, that is, checks whether there is a corresponding relationship between the prefix and the AS generating the prefix in the AA. Only if the verification is successful, the recipient trusts the received prefix information. If the verification is unsuccessful, a process is performed according to local configurations, for example, discarding the update message or postponing the verification and so on.

Two different verification methods are applied for verification of the AS_PATH in SBGP and SoBGP, which are described blow.

In SoBGP, verification of AS_PATH is as follows. ASs supporting SoBGP deliver information about their directly connected AS to each other. Each AS collects the received connection information to generate topology for AS interconnections. Upon receipt of an update message, the AS checks whether the AS_PATH is a path present in the topology. If the AS_PATH is a path present in the topology, the verification is successful; otherwise, if the AS_PATH is not a path present in the topology, a process is performed according to local configurations, for example, discarding the update message or postponing the verification and so on.

When such an SoBGP system verifies AS_PATH with this method, it is only possible to confirm the presence of the AS_PATH, and it is impossible to verify whether the ASs in the AS_PATH are legal, which leads to a lower security for the SoBGP system.

In SBGP, verification of AS_PATH is as follows. During delivery of an update message, an AS signs the update message with a private key in a nested way, that is, the signed information comprises the signed portion of a preceding AS in addition to the content of the update message. Upon receipt of the update message, a public key is used to check layer by layer whether the signatures are legal. For example, when an update message reaches the Nth AS (N>2), the AS verifies the signature of the (N−1)th AS. If the verification is successful, a further verification is performed on the signature of the (N−2)th AS, and so on, until the verification for the signature of the first AS is successful. Accordingly, the verification for the AS_PATH is successful, and the received AS_PATH is trusted. This attests that the update message passes each AS in the AS_PATH. Then, the update message and the signatures of the preceding ASs are signed. After other verifications are successful, the update message is sent to the (N+1)th AS. If the verification is unsuccessful, a process is performed according to local configurations, for example, discarding the update message or postponing the verification and so on. With this method for verification of the AS_PATH, verification may be made as to whether each AS in the AS_PATH is legal. Only when all ASs in the AS_PATH are legal ASs to receive the update message, the received AS_PATH is trusted.

During verification of the AS_PATH with the above SBGP approach, all signatures in the nested signatures have to be verified. If a signature of the update message is signed by AS1, N−1 verifications are needed; if it is signed by the second AS, N−2 verifications are needed; and so on. When N is large, the time of iterative verifications becomes larger and larger. Key computation steps which require CPU dense operations, will be executed many times for a verification, which causes a very large burden on the CPU of a device. Because one important measure for BGP is the network convergence speed, large occupancy of CPU resources may impose a serious impact on the routing computation in the case of SBGP, which makes the SBGP technique infeasible.

Furthermore, similar problems also exist for SoBGP and SGBP during verification of the prefix. Because each AS has to perform prefix verification, large CPU resources are occupied and the load on CPU is increased.

SUMMARY

In view of the above problems, an object of the invention is to provide a method and system for verifying update information in BGP, which may decrease the load on CPU during verification of the update information.

To achieve the above object, the disclosure provides a method for verifying update information in BGP, including:

upon receipt of an update message, verifying, by an Autonomous System (AS), update information in the update message according to a determined maximum time of verifications; and trusting the update information if the verifications are successful.

There is also provided with a system for verifying update information in BGP, including: an AS, configured to receive an update message from an announcer, verify update information in the update message according to a determined maximum time of verifications and trust the update information if the verifications are successful.

From the solution of the invention, it can be seen that upon receipt of an update message, an AS verifies the AS_PATH and/or prefix in the update message according to a maximum time of verifications which is determined uniformly in advance or determined by negotiation with the announcer of the update message, and trusts the update message if the verifications are successful. This ensures that the time of verifications will not exceed the maximum time of verifications when the AS verifies the update information. Accordingly, load on CPU is decreased during verification of the update information and hence the network convergence speed is improved. This solution is easier for implementation in comparison with SBGP systems, and more secure in comparison with SoBGP systems.

Furthermore, by adding information to a signature of an AS indicating whether the AS has verified the prefix, system resources may be saved in the invention.

DETAILED DESCRIPTION

Figure 1:
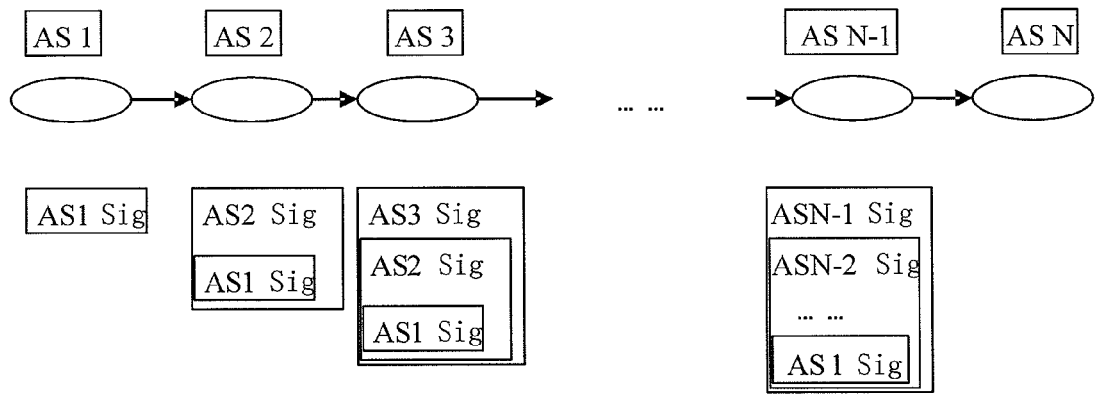
FIG. 1 is a diagram illustrating the AS paths through which an update message passes.

For a full understanding of the objects, the solutions and the advantages of the invention, detailed descriptions are made below by reference to accompanying drawings.

In BGP, there is a very small possibility that two ASs on the AS_PATH are breached at the same time or wrong configurations occur to two ASs at the same time, and such a possibility may be ignored. For the two BGP security issues as described in the background art, they are often caused due to wrong configurations more than attacks. Currently, it is rare that security issues are caused due to breaches of the routing devices. Typically, different ASs belong to different organizations and different organizations are responsible for the security protection. In this regard, there is a even less possibility that two ASs are breached by the same organization and are used to launch joint attacks and such a possibility may be ignored. Similarly, the possibility that three or more ASs are breached by the same organization and are used to launch joint attacks, is even less.

Due to the above reasons, the method for verifying update information in Border Gateway Protocol (BGP) as proposed in the invention includes: upon receipt of an update message, verifying, by an Autonomous System (AS), the update message according to a determined maximum time of verifications; and trusting the update message if the verifications are successful.

According to an embodiment of the invention, the maximum time of verifications may be determined by the AS from the maximum time of verifications uniformly preset in the AS, or by negotiation between the AS and the announcer of the update message.

The above step of verifying the update information according to the maximum time of verifications may include: only verifying the AS_PATH in the update message according to the maximum time of verifications, only verifying the prefix in the update message according to the maximum time of verifications, or verifying both the AS_PATH and the prefix in the update message according to their respective maximum times of verifications. The three verification manners are described below in detail with reference to specific embodiments.

In a first embodiment of the invention, an AS which receives the update message only verifies the AS_PATH in the update message according to the maximum time of verifications.

In this embodiment, an AS verifies the signatures in the AS_PATH of the update message in a nested way. Upon receipt of the update message, an AS sets a counter with its initial value being the maximum time of verifications i for the AS_PATH in the received update message, according to the maximum time of verifications i uniformly preset in the AS or according to the maximum time of verifications i determined by negotiation with the announcer of the update message. The maximum time of verifications i may be an integer more than 1, preferably an integer more than 2, for example, 2, 3, 4, 5, . . . . Each time an AS verifies a signature in the AS_PATH, the counter corresponding to the update message is decreased by 1. After the verification is passed, a next verification is then performed and the counter is decreased by 1. When the counter reaches 0, the signature verification is stopped. If the verifications for all signatures are successful, the AS_PATH in the received update message is trusted and the update message and all signatures in the AS_PATH are signed. Otherwise, if any verification is unsuccessful, a process is performed according to local configurations, for example, discarding the update message or postponing the verification and so on. Of course, the prefix verification is stopped if all signatures in the AS_PATH have been verified before the counter is decreased to 0. In this case, if the verifications for all signatures are successful, the AS_PATH in the received update message is trusted; otherwise, if any verification is unsuccessful, a process is performed according to local configurations, for example, discarding the update message or postponing the verification and so on.

As shown in FIG. 1, assuming that an update message passes through AS 1, AS 2, AS 3, . . . , AS N, where N is an integer, the update message is signed in a nested way: after AS 1 signs the update message, AS 2 signs the update message and the signature of AS 1; then, AS 3 signs the update message and the signatures of AS 1 and AS 2; and so on. Finally, AS N signs the update message and the signatures of the preceding AS 1 to AS N−1.

During verification, assuming that the maximum time of verifications i is 2, AS 1 only performs a signing step, and performs no verification step; AS 2 verifies the signature of AS 1, and after the verification is successful, AS 2 signs the update message and the signature of AS 1; AS 3 verifies the signatures of AS 1 and AS 2, and after the verifications are successful, AS 3 signs the update message and the signatures of AS 1 and AS 2; AS 4 only verifies the signatures of the i preceding ASs (that is, AS 3 and AS 2), and after the verifications are successful, AS 4 signs the update message and the signatures of AS 1, AS 2 and AS 3; AS 5 only verifies the signatures of the i preceding ASs (that is, AS 3 and AS 4), and after the verifications are successful, AS 5 signs the update message and the signatures of AS 1, AS 2, AS 3 and AS 4; and so on. AS N only verifies the signatures of AS N-1 and AS N-2. With such a verification method, for all ASs in the AS_PATH, it ensures that each AS only verifies its two preceding ASs when it has two or more preceding ASs, and that the signature of each AS is verified at most twice. When N is more than or equal to 4, the computational complexity for verification may be decreased significantly and the load on CPU may be reduced greatly with a guarantee for network security.

In a second embodiment of the invention, an AS which receives the update message only verifies the prefix in the update message according to the maximum time of verifications.

In this embodiment, an AS sets a prefix verification flag in the update message to indicate whether the AS has verified the prefix. This flag may have two values to indicate that the AS has verified the prefix and that the AS has not verified the prefix, respectively.

Upon receipt of an update message, an AS determines whether i ASs have verified the prefix according to the prefix verification flags in the update message, and the maximum time of verifications i uniformly preset in the AS, or the maximum time of verifications i determined by negotiation with the announcer of the update message. If i ASs have verified the prefix, no prefix verification is performed and a prefix verification flag is set in the update message to indicate that the AS has not performed prefix verification. Otherwise, if the prefix has not been verified by i ASs, the prefix is verified and a prefix verification flag is set in the update message to indicate that the AS has performed prefix verification.

For verification of the prefix in the update message according to this embodiment, the verification is performed only i times, which may decrease the load on CPU. Same as in the first embodiment, i may be an integer more than 1, preferably an integer more than 2.

In a third embodiment of the invention, both the prefix and the AS_PATH in the update message are verified according to their respective maximum times of verifications. In this embodiment, the maximum time of verifications for prefix verification may be same as, or different from that for AS_PATH verification. The specific methods for prefix verification and AS_PATH verification may be same as in the first and second embodiments, respectively.

In the following exemplary description to this embodiment with reference to FIG. 1, the maximum time of verifications for AS_PATH verification is same as that for prefix verification, and is 2.

Figure 2:
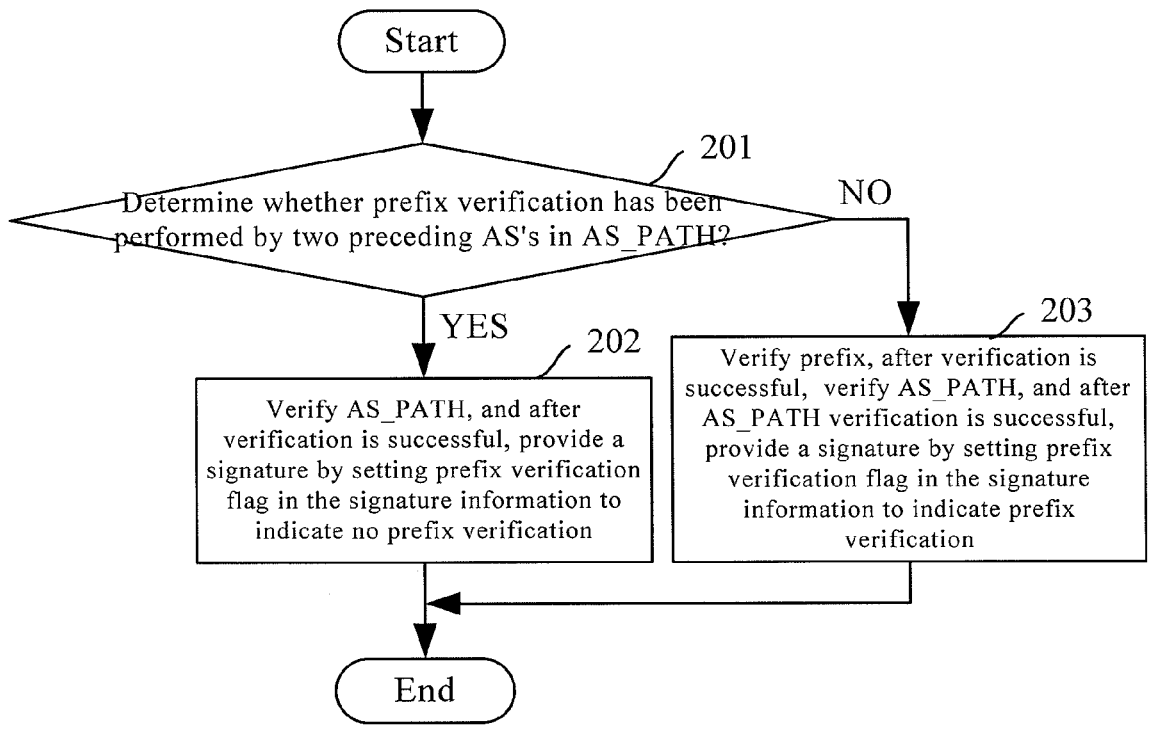
FIG. 2 is a diagram illustrating a third embodiment of the verification method according to the invention.

In FIG. 1, after AS 1 generates and announces a prefix, the prefix is verified by only two ASs along the way during the whole process of transmitting the update message. As shown in FIG. 2, except AS 1, any other AS which receives the update message performs the following steps.

In step 201, an AS which receives the update message, determines whether prefix verification has been performed by two preceding ASs. If prefix verification has been performed by two preceding ASs, the flow proceeds to step 202; if prefix verification has not been performed by two preceding ASs, the flow proceeds to step 203.

In this embodiment, an AS may add a field to the signature of the AS_PATH indicating whether the AS has verified the prefix, and this field is taken as the prefix verification flag. In this step, the operation of determining whether prefix verification has been performed by two preceding ASs is equivalent to that of determining whether the number of prefix verification flags indicating that prefix verification has been performed in all signatures of the AS_PATH has reached 2.

In step 202, the AS_PATH is verified, and after the verification is successful, a signature is provided, where the prefix verification flag in the signature information is set to indicate that prefix verification has not been performed.

In step 203, prefix verification is performed, and after the verification is successful, the AS_PATH is verified. After verification of the AS_PATH is successful, a signature is provided to set the prefix verification flag in the signature information to indicate that prefix verification has been performed. If the verification is unsuccessful, a process is performed according to local configurations, for example, discarding the update message or postponing the verification and so on.

The method for verifying the AS_PATH in step 202 and this step is same as that in the first embodiment, and the description is omitted here.

AS 1, the sender of the update message, generates a prefix and announces this prefix to other ASs. Instead of including a prefix verification flag in the signature information, AS 1 may set a prefix verification flag in the signature information. When setting the prefix verification flag, AS 1 may verify its own generated prefix according to the AA or may perform no verification, and sets the prefix verification flag according to information indicating whether verification is performed.

With the schemes for prefix verification in embodiments of the invention, the computational complexity for prefix verification is reduced and the CPU occupancy decreases in comparison with SoBGP and SBG systems. The implementation is simple and the verification efficiency is improved.

Compared with SoBGP, the proposed solution is more complete and trustworthy in verification of the AS_PATH and may provide an increased security. Compared with SBGP, the proposed solution decreases the CPU occupancy and increases the network convergence speed with substantially no impact on the security level of the SBGP system, and is easier for implementation in comparison with SBGP.

Additionally, the invention may be applied to incremental deployments. When applied to incremental deployments, the efficiency of prefix verification is higher than SBGP and SoBGP systems, and the integrity of AS_PATH verification is better than SoBGP systems.

The invention has been described in terms of specific embodiments, but various modifications are possible to accommodate particular requirements when the invention is practiced. Accordingly, it is to be understood that the specific embodiments are just illustrative of, instead of limitative to the scope of the invention.

What is claimed is:

1. A method for verifying update information in Border Gateway Protocol referred to as BGP hereafter, comprising:
    upon receipt of an update message, verifying, by an Autonomous System referred to as AS hereafter, update information in the update message according to a determined maximum time of verifications;
    trusting the update information if the verifications are successful;

wherein the update information comprises Autonomous System Paths referred to as AS_PATH hereafter, and wherein verifying the update information according to the determined maximum time of verifications comprises:

verifying nested signatures of preceding ASs of the AS in the AS_PATH layer by layer;

stopping verification after the number of verified signatures reaches a first maximum time of verifications;

wherein the update information further comprises a prefix, and wherein verifying the prefix according to the determined maximum time of verifications further comprises:

determining, by the AS, whether a total time of verifying the prefix by its preceding ASs has reached a second maximum time of verifications;

trusting the prefix directly if the total time of verifying the prefix by its preceding ASs has reached the second maximum time of verifications; and verifying the prefix in the update message if the total time of verifying the prefix by its preceding ASs has not reached the second maximum time of verifications.

2. The method according to claim 1, wherein the maximum time of verifications is determined:

by the AS, from the maximum time of verifications uniformly preset in the AS; or by negotiation between the AS and an announcer of the update message.

3. The method according to claim 1, wherein verifying the nested signatures of the preceding ASs of the AS in the AS_PATH layer by layer comprises:

verifying the signature of a first unverified preceding AS in the AS_PATH;

returning to re-execute this step if the verification is successful; and processing according to local configurations if the verification is unsuccessful.

4. The method according to claim 3, wherein stopping verification after the number of verified signatures reaches the first maximum time of verifications comprises:

setting a counter with its initial value being the first maximum time of verifications for the received update message;

decreasing the counter by 1 each time the AS verifies a signature; and stopping verification when the counter is decreased to 0.

5. The method according to claim 3, before stopping verification after the number of verified signatures reaches the first maximum time of verifications, further comprising:

stopping verification after verifying all signatures; and trusting the update information if the verifications for all the signatures are successful.

6. The method according to claim 1, wherein determining, by the AS, whether the total time of verifying the prefix by its preceding ASs reaches the second maximum time of verifications comprises:

determining, by the AS, whether a number of signatures included in the update message indicating that preceding ASs have verified the prefix has reached the second maximum time of verifications; and indicating in a signature, by the AS, whether the AS has verified the prefix when providing the signature.

7. The method according to claim 1, wherein the determined maximum time of verifications is more than or equal to 2.

8. The method according to claim 1, wherein verifying the update information in the update message according to the determined maximum time of verifications comprises:

processing according to local configurations if any verification is unsuccessful.

9. A system for verifying update information in Border Gateway Protocol referred to as BGP hereafter, comprising:

an Autonomous System referred to as AS hereafter, configured to receive an update message from an announcer, verify update information in the update message according to a determined maximum time of verifications and trust the update information if the verifications are successful;

wherein the update information comprises Autonomous System Paths referred to as AS_PATH hereafter, and wherein the AS is further configured to:

verify nested signatures of preceding ASs of the AS in the AS_PATH layer by layer;

stop verification after the number of verified signatures reaches a first maximum time of verifications;

wherein the update information further comprises a prefix, and wherein the AS is further configured to:

determine whether a total time of verifying the prefix by its preceding ASs has reached a second maximum time of verifications;

trust the prefix directly if the total time of verifying the prefix by its preceding ASs has reached the second maximum time of verifications; and verify the prefix in the update message if the total time of verifying the prefix by its preceding AS's has not reached the second maximum time of verifications.

10. The system according to claim 9, wherein the AS is further configured to:

verify the signature of a first unverified preceding AS in the AS_PATH;

return to re-execute this step if the verification is successful; and process according to local configurations if the verification is unsuccessful.

11. The system according to claim 9, wherein the AS is further configured to:

set a counter with its initial value being the first maximum time of verifications for the received update message;

decrease the counter by 1 each time the AS verifies a signature; and stop verification when the counter is decreased to 0.

* * * * *